(12) United States Patent
Liang et al.

(10) Patent No.: US 7,141,279 B2
(45) Date of Patent: *Nov. 28, 2006

(54) TRANSMISSIVE OR REFLECTIVE LIQUID CRYSTAL DISPLAY AND NOVEL PROCESS FOR ITS MANUFACTURE

(75) Inventors: Rong-Chang Liang, Cupertino, CA (US); Scott C-J Tseng, San Jose, CA (US); Ying-Syi Li, San Jose, CA (US)

(73) Assignee: SiPix Imaging, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/718,990

(22) Filed: Nov. 21, 2003

(65) Prior Publication Data

US 2004/0170776 A1    Sep. 2, 2004

Related U.S. Application Data

(60) Provisional application No. 60/429,177, filed on Nov. 25, 2002.

(51) Int. Cl.
*G02F 1/1339* (2006.01)

(52) U.S. Cl. .............................. 428/1.5; 349/86; 349/89

(58) Field of Classification Search .................. 428/1.3, 428/1.5; 359/237–238, 296, 242; 204/450, 204/600; 345/105, 107; 349/86, 89–90
See application file for complete search history.

(56) References Cited

U.S. PATENT DOCUMENTS

| | | | |
|---|---|---|---|
| 3,229,607 A | 1/1966 | Battaglia | 355/88 |
| 3,612,758 A | 10/1971 | Evans | 348/803 |
| 3,668,106 A | 6/1972 | Ota | 358/305 |
| 3,689,346 A | 9/1972 | Rowland | 156/245 |
| 3,885,964 A | 5/1975 | Nacci | 430/328 |
| 3,908,052 A | 9/1975 | Sanders | 428/1.5 |
| 3,928,671 A | 12/1975 | Robusto et al. | 438/572 |
| 4,071,430 A | 1/1978 | Liebert | 359/241 |
| 4,093,534 A | 6/1978 | Carter et al. | 359/296 |
| 4,190,352 A | 2/1980 | Bruning | 355/19 |
| 4,285,801 A | 8/1981 | Chiang | 252/582 |
| 4,680,103 A | 7/1987 | Beilin Solomon I. et al. | 359/296 |
| 4,741,604 A | 5/1988 | Kornfeld | 359/296 |
| 4,741,988 A | 5/1988 | Van der Zande et al. | 430/312 |
| 4,891,245 A | 1/1990 | Micale | 427/213.3 |
| 4,924,257 A | 5/1990 | Jain | 355/53 |
| 5,162,434 A * | 11/1992 | Pielartzik et al. | 525/66 |
| 5,200,120 A | 4/1993 | Sakai | 264/1.33 |
| 5,264,517 A * | 11/1993 | Endo et al. | 528/26 |
| 5,274,481 A | 12/1993 | Kim | 349/86 |
| 5,276,438 A | 1/1994 | DiSanto et al. | 345/107 |
| 5,279,511 A | 1/1994 | DiSanto et al. | 445/24 |

(Continued)

FOREIGN PATENT DOCUMENTS

CA    2340683    2/2001

(Continued)

OTHER PUBLICATIONS

U.S. Appl. No. 09/759,212, filed Nov. 2001, Liang et al.

(Continued)

*Primary Examiner*—Harold Pyon
*Assistant Examiner*—Sow-Fun Hon
(74) *Attorney, Agent, or Firm*—Howrey LLP

(57) ABSTRACT

This invention relates to a liquid crystal display with improved contrast ratio, switching performance, reflectivity at the Dmin state and structural integrity, and methods for its manufacture.

20 Claims, 4 Drawing Sheets

U.S. PATENT DOCUMENTS

| | | | |
|---|---|---|---|
| 5,285,236 A | 2/1994 | Jain | 355/53 |
| 5,366,663 A * | 11/1994 | Romer et al. | 525/425 |
| 5,380,362 A | 1/1995 | Schubert | 106/493 |
| 5,398,041 A | 3/1995 | Hyatt | 345/88 |
| 5,403,518 A | 4/1995 | Schubert | 252/572 |
| 5,432,526 A | 7/1995 | Abe | 528/353 |
| 5,450,220 A | 9/1995 | Onishi et al. | 349/89 |
| 5,480,938 A | 1/1996 | Badesha et al. | 525/104 |
| 5,573,711 A | 11/1996 | Hou et al. | 252/572 |
| 5,589,100 A | 12/1996 | Grasso et al. | 252/299.01 |
| 5,652,645 A | 7/1997 | Jain | 355/53 |
| 5,699,097 A | 12/1997 | Takayama et al. | 347/171 |
| 5,731,860 A | 3/1998 | Harada et al. | 349/158 |
| 5,739,889 A | 4/1998 | Yamada et al. | 349/156 |
| 5,835,174 A | 11/1998 | Clikeman et al. | 349/86 |
| 5,843,333 A | 12/1998 | Hakemi | 252/299.5 |
| 5,877,848 A | 3/1999 | Gillette et al. | 355/85 |
| 5,895,541 A | 4/1999 | Kobayashi et al. | 156/240 |
| 5,914,806 A | 6/1999 | Gordon II et al. | 359/296 |
| 5,930,026 A | 7/1999 | Jacobson et al. | 359/296 |
| 5,942,154 A | 8/1999 | Kim et al. | 252/299.01 |
| 5,943,113 A | 8/1999 | Ichihashi | 349/187 |
| 5,956,112 A | 9/1999 | Fujimori et al. | 349/156 |
| 5,961,804 A | 10/1999 | Jacobson et al. | 204/606 |
| 5,967,871 A | 10/1999 | Kaake et al. | 445/24 |
| 5,976,405 A | 11/1999 | Clikeman et al. | 252/299.01 |
| 5,978,062 A | 11/1999 | Liang et al. | 349/155 |
| 5,985,084 A | 11/1999 | Summersgill et al. | 156/273.7 |
| 5,995,190 A | 11/1999 | Nagae et al. | 349/156 |
| 6,017,584 A | 1/2000 | Albert et al. | 427/213.3 |
| 6,018,383 A | 1/2000 | Dunn et al. | 355/49 |
| 6,037,058 A | 3/2000 | Clikeman et al. | 428/402.2 |
| 6,064,508 A | 5/2000 | Forgette et al. | 359/267 |
| 6,067,135 A * | 5/2000 | Shimizu et al. | 349/86 |
| 6,067,185 A | 5/2000 | Albert et al. | 359/296 |
| 6,113,810 A | 9/2000 | Hou et al. | 252/572 |
| 6,113,836 A | 9/2000 | Sakai et al. | 264/400 |
| 6,120,588 A | 9/2000 | Jacobson | 106/31.16 |
| 6,120,839 A | 9/2000 | Comiskey et al. | 427/213.3 |
| 6,120,946 A | 9/2000 | Johnson et al. | 430/7 |
| 6,166,797 A | 12/2000 | Bruzzone et al. | 349/155 |
| 6,172,798 B1 | 1/2001 | Albert et al. | 359/296 |
| 6,184,856 B1 | 2/2001 | Gordon, II et al. | 345/107 |
| 6,191,250 B1 | 2/2001 | Aida et al. | 528/196 |
| 6,239,896 B1 | 5/2001 | Ikeda | 359/240 |
| 6,304,309 B1 * | 10/2001 | Yamanaka et al. | 349/156 |
| 6,312,304 B1 | 11/2001 | Duthaler et al. | 445/24 |
| 6,319,381 B1 | 11/2001 | Nemelka | 204/485 |
| 6,327,072 B1 | 12/2001 | Comiskey et al. | 359/296 |
| 6,337,761 B1 | 1/2002 | Rogers et al. | 359/296 |
| 6,392,785 B1 | 5/2002 | Albert et al. | 359/286 |
| 6,392,786 B1 | 5/2002 | Albert | 359/296 |
| 6,400,430 B1 | 6/2002 | Nakao et al. | 349/89 |
| 6,400,492 B1 | 6/2002 | Morita et al. | 359/296 |
| 6,512,626 B1 | 1/2003 | Schmidt | 359/296 |
| 6,514,328 B1 | 2/2003 | Katoh et al. | 106/31.28 |
| 6,525,865 B1 | 2/2003 | Katase | 359/296 |
| 6,545,797 B1 * | 4/2003 | Chen et al. | 359/296 |
| 6,650,384 B1 * | 11/2003 | Oguchi et al. | 349/86 |
| 6,652,075 B1 | 11/2003 | Jacobson | 347/55 |
| 6,672,921 B1 | 1/2004 | Liang et al. | 445/24 |
| 6,753,067 B1 * | 6/2004 | Chen et al. | 428/166 |
| 2002/0018043 A1 | 2/2002 | Nakanishi | 345/107 |
| 2002/0029969 A1 | 3/2002 | Yager et al. | 204/455 |
| 2002/0075556 A1 | 6/2002 | Liang et al. | 359/296 |
| 2002/0131152 A1 | 9/2002 | Liang et al. | 359/296 |
| 2002/0182544 A1 | 12/2002 | Chan-Park et al. | 430/311 |
| 2002/0188053 A1 | 12/2002 | Zang et al. | 524/474 |
| 2002/0196525 A1 | 12/2002 | Chen et al. | 359/296 |
| 2003/0007238 A1 | 1/2003 | Liang et al. | 359/296 |
| 2003/0039022 A1 | 2/2003 | Liang et al. | 359/296 |
| 2003/0053190 A1 | 3/2003 | Liang et al. | 359/296 |

FOREIGN PATENT DOCUMENTS

| | | |
|---|---|---|
| DE | 199 27 359.6 | 12/2000 |
| EP | 0 990 942 | 4/2000 |
| EP | 1 065 553 | 1/2001 |
| EP | 1 089 118 | 4/2001 |
| EP | 1 122 560 | 8/2001 |
| EP | 1 195 603 | 4/2002 |
| JP | 57104116 | 6/1982 |
| JP | 59171930 | 9/1984 |
| JP | 60-205452 | 10/1985 |
| JP | 62-203123 | 9/1987 |
| JP | 64-86116 | 3/1989 |
| JP | 02223934 | 9/1990 |
| JP | 02284125 | 11/1990 |
| JP | 02284126 | 11/1990 |
| JP | 6242423 | 9/1994 |
| JP | 2000 035677 | 2/2000 |
| JP | 2000 075497 | 3/2000 |
| JP | 2001 042118 | 2/2001 |
| JP | 2001 056653 | 2/2001 |
| WO | WO 98/57226 | 12/1998 |
| WO | WO 99/08151 | 2/1999 |
| WO | WO 99/53373 | 10/1999 |
| WO | WO 99/56171 | 11/1999 |
| WO | WO 00/03291 | 1/2000 |
| WO | WO 00/36649 | 6/2000 |
| WO | WO 00/60410 | 10/2000 |
| WO | WO 00/77571 | 12/2000 |
| WO | WO 01/67170 | 9/2001 |
| WO | WO 02/01281 | 1/2002 |
| WO | WO 02/56097 | 7/2002 |
| WO | WO 02/65215 | 8/2002 |
| WO | WO 03/19280 | 3/2003 |

OTHER PUBLICATIONS

U.S. Appl. No. 09/518,488, filed Mar. 2000, Liang et al.
U.S. Appl. No. 10/444,760, filed May 2003, Liang et al.
U.S. Appl. No. 10/388,890, filed Mar. 2003, Liang et al.
U.S. Appl. No. 10/372,027, filed Feb. 2003, Liang et al.
U.S. Appl. No. 10/351,460, filed Jan. 2003, Liang et al.
Bryning et al., "37.4: Reverse-Emulsion Electrophoretic Display (REED)" *SID 98 Digest* pp. 1018-1021 (1998).
Comiskey et al, "An Electrophoretic Ink for All-printed Reflective Electronic Displays", Letters to Nature, MIT, The Media Laboratory, 20 Ames Street, Cambridge, MA 02139-4307, USA, May 1998, pp. 253-255.
Dalisa, A. L., "Electrophoretic Display Technology", IEEE Trans. Electron Devices, pp. 827-834 (1977).
Drzaic, P.S., "Liquid Crystal Dispersions", 1995. Index of Contents.
Drzaic, P.S., "Liquid Crystal Dispersions", The PDLC Paradigm, pp. 1-9, (1995).
Harbour, J. R., "Subdivided Electrophoretic Display" Xerox Disclosure Journal, US Xerox Corporation, Stamford, Conn., 4(6):705, Nov. 1979, XP002123212.
Harvey, T.G., "Replication Techniques for Micro-optics", SPIE Proc., vol. 3099, pp. 76-82 (1997).
Hopper, M. A. et al, "An Electrophoretic Display, its Properties, Model and Addressing", IEEE Transactions on Electron Devices, 26(8): 1148-1152 (1979).
Inoue, S. et al., "High Resolution Microencapsulated Electrophoretic Display (EPD) Driven by Poly-Si TFTs With Four-Level Grayscale" *IEEE Transactions on Electron Devices* 49(8), pp. 1532-1539 (2002).
Kazlas, P. et al., "12.1: 12.1" SVGA Microencapsulated Electrophoretic Active Matrix Display for Information Applicances *SID 01 Digest* 152-155 (2001).
Kishi, E et al, "5.1 Development of In-Plane EPD", Canon Research Center, SID 00 Digest, pp. 24-27.

Lewis, J.C., "Electrophoretic Displays", Allen Clark Research Centre, The Plessey Company Ltd., Caswell, Towcester, Northants, England, pp. 223-240.

Matsuda Y. "Newly designed, high resolution, active matrix addressing in plane EPD" *IDW 02 EP2-3* 1341-1344 (2002).

Murau and Singer, "The Understanding and Elimination of Some Suspension Instabilities in an Electrophoretic Display", Philips Laboratories, Briarcliff Manor, NY 10510, Apr. 10, 1978, J. Appl. Phys. 49(9), pp. 4820-4829.

Nakamura, et al, "Development of Electrophoretic Display using Microencapsulated Suspension", NOK Corporation, Kanagawa, Japan & NOK Corporation, Ibaraki, Japan, SID 98 Digest, pp. 1014-1017.

Ota et al., "Developments in Electrophoretic Displays" *Proc. of SID*, vol. 18/3&4, pp. 243-254 (1977).

Ota, et al., Electrophoretic Image Display (EPID) Panel, Wireless Research Laboratory, Matsushita Electric Industrial Company, Ltd., Osaka, 571, Japan, received Feb. 7, 1973, pp. 832-836, Jul. 1973.

Singer, B. et al, "X-Y Addressable Electrophoretic Display", Proc. SID 18(3/4), pp. 255-266 (1977).

Slafer, W. D. et al, "Continuous Manufacturing of Thin Cover Sheet Optical Media", SPIE Proc., vol. 1663, pp. 324-335 (1992).

Swanson et al., "5.2: High Performance Electrophoretic Displays" *SID 00* Diges, pp. 29-31 (2000).

Allen, K. << Electrophoretics Fulfilled >>, Emerging Displays Review, iSuppli Corporation, Oct. 2003, pp. 9-14.

Chen, S.M., << The Applications for the Revolutionary Electronic Paper Technology >>, OPTO News & Letters, 2003, Jul., 102, pp. 37-41 (in Chinese, English abstract attached, full translation available upon request).

Zang, H.M. and Liang, R.C., << Microcup Electronic Paper by Roll-to-Roll Manufacturing Processes >>, Spectrum, 2003, Summer. 16/2, pp. 16-21.

Liang, R.C. and Lee, H., << SiPix Microcup(R) Electronic Paper—An Introduction >>, Advanced Display, 2003, Jun., Issue, pp. 4-9 (in Chinese, English abstract attached, full translation available upon request).

Liang, R.C. et al, << Microcup(R) Active and Passive Matrix Electrophoretic Displays by A Roll-to-Roll Manufacturing Processes >>, SID Digest, May 21-22, 2003, 20.1/R.C. Liang.

Chen, S.M., << The New Applications and the Dynamics of Companies >>, TRI, May, 2003 (in Chinese, English abstract attached, full translation availabe upon request).

Liang, R.C. et al, << Microcup(R) displays : Electronic Paper by Roll-to-Roll Manufacturing Processes >>, Journal of the SID, vol. 11/4, Feb. 18-23 2003, pp. 621-628.

Liang, R.C. et al, << Passive Matrix Microcup(R) Electrophoretic Displays >>, IDMC '03, Feb. 18-21, Taipei, Liang, Paper Fr-17-5.

Liang, R.C. and Tseng, S., << Microcup(R) LCD, A New Type of Dispersed LCD by a Roll-to-Roll Manufacturing Process >>, IDMC '03, Feb. 18-21, Taipei, Liang, Paper We-02-04.

Liang, R.C., << Microcup(R) Electrophoretic and Liquid Crystal Displays by Roll-to-Roll Manufacturing Processes >>, USDC Flexible Microelectronics & Displays Conference, Feb. 3-4, 2003, Phoenix, Arizona, USA.

Liang, R.C. et al, << Microcup Electrophoretic Displays by Roll-to-Roll Manufacturing Processes >>, IDW '02, Dec. 4-6, pp. 1337-1340.

* cited by examiner

Off State
Scatters Light

On State
Transparent, Clear

TRANSMISSIVE OR REFLECTIVE LIQUID CRYSTAL DISPLAY AND NOVEL PROCESS FOR ITS MANUFACTURE

RELATED APPLICATION

This application claims the priority under 35 USC 119(e) of U.S. Provisional Applications No. 60/429,177, filed Nov. 25, 2002. The whole content of the priority application is incorporated into this application by reference.

BACKGROUND OF THE INVENTION a) Field of the Invention

This invention relates to a liquid crystal display with improved contrast ratio, switching performance, reflectivity at the Dmin state and structural integrity, and methods for its manufacture.

b) Background

A polymer dispersed liquid crystal (PDLC) display usually comprises two transparent plates with electrodes placed opposing each other, separated by using spacers. A thin film of PDLC is enclosed between the two plates. The PDLC film may be up to 200 micron thick, but usually having a thickness of between 2 microns and 50 microns. The liquid crystal filled cell is hermetically sealed in order to eliminate oxygen and moisture, both of which may chemically attack the liquid crystals. A thorough review of the PDLC technologies can be found in "Liquid Crystal Dispersions" by P. S. Drzaic (1995).

A PDLC typically consists of micron-size droplets of low-molecular-weight nematic liquid crystals dispersed in a polymer binder. The nematic droplets strongly scatter light and the material has a white opaque or translucent appearance ("off" state). When a voltage difference is imposed between the two electrodes ("on" state"), the electric field aligns the droplets such that the ordinary refractive index of the liquid crystals nearly matches that of the isotropic polymer matrix, substantially reducing the scattering power of the droplets, thus allowing light to transmit through. The cells thus appear clear or transparent in the "on" state and opaque in the "off" state.

In a guest-host PDLC display, a dye, particularly a pleochroic or dichroic dye, is added as a guest to the liquid crystals to produce a high color contrast display. For example, the dye molecules may have a property to orientate themselves parallel to the liquid crystal molecules. Therefore if a dichroic dye having a bar-shaped structure is added to the liquid crystals, the direction of the dye molecules also changes if the molecular direction of the liquid crystals is changed by applying an electric field on the opposing electrodes. Because the dyes are made colored or do not depend on the orientation direction, it is possible for them to switch between a colored state ("off" state) and a colorless state ("on" state) by applying a voltage on the two electrodes. The use of dichroic or pleochroic dyes in guest-host PDLC displays to improve the contrast ratio is known in the art.

A PDLC display may be transmissive and/or reflective. A transmissive PDLC display has an internal illumination source. Imposing a voltage on the two electrodes allows light to pass through the liquid crystal filled cell. A typical example of a transmissive PDLC display is a PDLC overhead projector. Reflective PDLC displays typically contain a reflective black or colored filter which becomes visible in the transparent state. Reflective PDLC displays may be found in PDA (personal digital assistant) devices. Transmissive and reflective PDLC displays are particularly attractive because polarizers are eliminated. Polarizers substantially reduce light and decrease brightness of both direct view and projection displays. The absence of polarizers also gives a better viewing angle.

The PDLC displays prepared by processes previously used have many shortcomings. For example, the polymer dispersed liquid crystals typically have droplets of a very broad particle size distribution, which results in significant hysteresis, higher operation voltage, poor contrast ratio, undesirable red bleedthrough and low level of multiplexing. However, the hysteresis of PDLC films must be low to show reproducible gray scales, and low voltage operation and high contrast ratio of the device are essential for most PDA applications. Monodispersed liquid crystal particles in the micron size range have been disclosed in U.S. Pat. No. 5,835,174, (Clikeman, et al.), 5,976,405 (Clikeman, et al.) and 6,037,058 (Clikeman, et al.) to reduce the hysteresis and operation voltage and to improve the level of multiplexity. The contrast ratio of the PDLC device prepared from the monodispersed particles remains low for most applications. To improve the contrast ratio without trade-off in the thickness of the PDLC film and operation voltage, guest dyes, preferably pleochroic dyes or dichroic dyes, are needed. However, the processes do not allow for the precise enclosure of a high concentration of guest dyes in the liquid crystal phase during manufacture, such that only a low concentration of dyes may be encapsulated in the monodispersed polymer particles. Some guest dyes may be left outside of the particles, thereby resulting in an increase in Dmin (the minimum optical density of the background) and a lower contrast ratio. In all cases, the process previously used involves a costly process to separate and purify particles from an aqueous phase followed by a process to re-disperse the particles in an organic binder.

An improved liquid crystal display was disclosed in a co-pending application, U.S. Ser. No. 09/759,212 filed on Jan. 11, 2001 (corresponding to WO02/56079), the content of which is incorporated herein by reference in its entirety. The improved liquid crystal display comprises isolated cells formed from microcups of well-defined shape, size and aspect ratio and filled with a liquid crystal composition optionally comprising guest dye(s). The filled cells are individually sealed with a polymeric sealing layer, preferably formed from a composition comprising a material selected from the group consisting of thermoplastics, thermoplastic elastomers, thermosets and precursors thereof.

The microcup structure enables a format flexible and efficient roll-to-roll continuous manufacturing process for the preparation of liquid crystal displays. The displays can be prepared on a continuous web of a conductor film such as ITO/PET by, for example, (1) coating a radiation curable composition onto the ITO/PET film, (2) forming the microcup structure by a microembossing or photolithographic method, (3) filling a liquid crystal composition into the microcups and sealing the filled microcups, (4) laminating the sealed microcups with the other conductor film and (5) slicing and cutting the display to a desirable size or format for assembling.

One advantage of this type of liquid crystal displays is that the liquid crystals are enclosed in the microcups. In one embodiment, the microcups may be of uniform size and shape. This significantly reduces the hysteresis and the reorientation field strength. In addition, before being filled with a liquid crystal composition, the microcups may be surface treated or modified to alter the surface properties for optimum contrast ratio and response rate.

The other advantage of this type of liquid crystal displays is that the microcup wall is in fact a built-in spacer to keep the top and bottom substrates apart at a fixed distance. The mechanical properties and structural integrity of microcup-based displays are significantly better than traditional dispersed liquid crystal displays. Moreover, the microcups may be sequentially filled with liquid crystal compositions of different specific properties such as colors and switching rates, and isolated by a sealing layer. Unlike the Clikeman's process of preparing monodispersed liquid crystal particles, guest dyes may be incorporated easily into a microcup-based liquid crystal display without involving any time-consuming or costly procedures.

In traditional dispersed liquid crystal displays, the formulation window of compositions of both the liquid crystal and polymer phases is quite limited. In contrast, the two phases may be optimized independently in the microcup-based liquid crystal displays. Moreover, the microcups may be surface-treated, if necessary, to modify the interaction between the liquid crystals and the microcup walls to achieve optimal electro-optical response for various applications.

The whole content of each document referred to in this application is incorporated by reference into this application in its entirety.

SUMMARY OF THE INVENTION

The present application is directed to a novel dispersed liquid crystal display (LCD) structure having improved contrast ratio, switching performance and structural integrity and its manufacture.

The first aspect of the invention is directed to a composition comprising liquid crystals for the preparation of microcup-based liquid crystal displays. In one embodiment, the liquid crystal concentration is no greater than its solubility limit in the hardened microcup composition. The composition may be an embossable composition.

The second aspect of the invention is directed to a composition for the preparation of microcups used in a liquid crystal display which composition comprises a speed enhancing comonomer or oligomer to improve the switching rate and reduce operation voltage or reorientation field. Suitable speed enhancing comonomers or oligomers for preparation of the microcups may include, but are not limited to, comonomers or oligomers comprising poly(ethylene glycol) or poly(propylene glycol) moiety, such as poly(ethylene glycol) monoacrylate, poly(ethylene glycol) monomethacrylate, poly(ethylene glycol) diacrylate, poly(ethylene glycol) dimethacrylate, poly(propylene glycol) monoacrylate, poly(propylene glycol) monomethacrylate, poly(propylene glycol) diacrylate, poly(propylene glycol) dimethacrylate or the like.

The main component of the compositions of the first and second aspects of the invention may be a material selected from the group consisting of thermoplastics, thermosets and precursors thereof.

Either one of the two microcup compositions described above may be used in a liquid crystal display having a single layer or multilayer of microcup array.

The microcup compositions are optimized such that the isotropic refractive index of the microcup composition after curing is matched to the ordinary refractive index of the liquid crystals.

In the liquid crystal display having two or more layers of microcup array stacked together, the microcups are filled with liquid crystal compositions optionally comprising guest dye(s) and individually sealed. The microcups of the multiplayer liquid crystal display may be filled with liquid crystal compositions comprising different guest dyes of different optical densities or switching speeds. For a full-color or multicolor liquid crystal display having two or more layers of microcup array, the microcup arrays may comprise, for example, red, green or blue microcups which are filled with liquid crystal compositions comprising red, green and blue guest dyes, respectively. In one embodiment, the microcups may be of different shapes, dimensions or ratios of opening to total area.

In addition, the inactive partition areas of one layer are at least partially overlapped with the active areas of the layer above or underneath. The term "staggered" will be used throughout the application to describe this arrangement. In one embodiment, the inactive areas and the active areas are completely overlapped.

In a manner similar to conventional PDLC displays, the liquid crystal display of the present invention strongly scatters light in the absence of an electric field (the "off" state). When a voltage difference is applied between the two electrodes, the electric field aligns the liquid crystals and substantially reduces scattering power, allowing light to transmit through the "on" state. However, unlike the PDLC displays, the liquid crystal display of this invention reaches the maximum optically clear state at a much lower voltage and, when the applied voltage is withdrawn, reverts back to the original "off" state without the undesirable hysteresis. The low operation voltage or reorientation field strength, fast response time and the absence of hysteresis are critical for high quality display applications where low power consumption and reproducible gray scales and video rate are highly desirable.

The multilayer liquid crystal displays of the invention have shown a significant higher contrast ratio than single layer displays. The addition of liquid crystals or a speed enhancing comonomer/oligomer in the microcup composition further improves the switching rate and reduces the operation voltage or reorientation field.

The multiplayer liquid crystal display of the present invention is not sensitive to environment, particularly humidity and temperature. The display may be very thin, flexible, durable, easy-to-handle and format-flexible. Moreover, the multilayer liquid crystal displays of the invention have shown a superior contrast ratio, switching performance, operation voltage and structural integrity.

The third aspect of the invention is directed to methods for the manufacture of a liquid crystal display having two or more layers of microcup array stacked together.

A single layer of the microcup-based liquid crystal display may be prepared by following a sequence of processing steps. The processing steps include preparation of the microcups on a conductor film by microembossing, photolithography or pre-punched holes as described in WO02/56097 and U.S. copending application Ser. No. 09/942,532 (corresponding to U.S. Publication No. 2002-75556), filling the microcups with a liquid crystal composition optionally with guest dye(s), sealing the filled microcups by either the one-pass or two-pass process as described in WO02/56097 and finally laminating the sealed microcups with a second conductor film, optionally precoated with an adhesive layer. The adhesive may be a hot-melt, heat curable, moisture curable or radiation curable adhesive. In one embodiment, a UV curable adhesive is used.

A single layer of a full-color or multi-color reflective liquid crystal display may be prepared by laminating or coating the empty microcups with a layer of positively working photoresist, selectively opening a certain number of microcups in a predetermined area by image wise exposing the positive photoresist, followed by developing the photoresist, filling the opened microcups with a liquid crystal composition optionally comprising guest dye(s), preferably dichroic dyes of a first color, and sealing the filled microcups by either the one-pass or two-pass process as described in WO02/56097. These steps may be repeated to create sealed microcups filled with liquid crystal compositions comprising guest dyes of a second or a third color. The filling of the liquid crystal composition may be accomplished by a coating process followed by a scraping or doctoring process to remove the excess fluid. Alternatively, the filling may be accomplished by a printing process such as ink jet printing.

The multilayer liquid crystal display of the present invention may be built layer by layer by repeating cycles of coating, embossing, filling and sealing, and finally laminating onto the stack a second conductor substrate, optionally with an adhesive layer. Alternatively, after two or more layers of microcup array are separately prepared on conductor substrates, they then may be laminated together to form a two-layer or multilayer microcup-based liquid crystal display. A further alternative involves separately preparing layers of microcup array on temporary release substrates. The multilayer liquid crystal display may then be accomplished by transferring the preformed display layer onto a display layer on a conductor substrate or onto a conductor substrate directly.

These multiple step processes may be carried out roll-to-roll continuously or semi-continuously. Consequently, they are suitable for high volume and low cost production. These processes are also efficient and inexpensive as compared to other processes for high volume production.

BRIEF DESCRIPTION OF THE DRAWINGS

FIG. 3a shows a process of preparing a two-layer liquid crystal display by laminating two layers of microcup array with the sealing sides of the microcups facing each other. FIG. 3b shows another process of preparing a two-layer liquid crystal display by (i) transferring a layer of microcup array from a release substrate onto a second layer of microcup array on a conductor film and (ii) laminating the resultant composite film onto a conductor film, optionally with an adhesive. The process (i) may be repeated to prepare a liquid crystal display having more than two layers of microcup array.

DETAILED DESCRIPTION OF THE INVENTION

Definitions

Unless defined otherwise in this specification, all technical terms are used herein according to their conventional definitions as they are commonly used and understood by those of ordinary skill in the art.

The term "microcup" refers to the cup-like indentation created by microembossing, photolithography or pre-punched holes.

The term "monodispersed", when describing the microcups or cells, is intended to indicate that the microcup or cell has a narrow distribution of dimensions such as diameter, length, width and height.

The term "aspect ratio" is a commonly known term in the art of PDLC displays. In this application, it refers to the depth to width or depth to length ratio of the microcups.

The term "Dmax" refers to the maximum achievable optical density of the display.

The term "Dmin" refers to the minimum optical density of the display background.

The term "contrast ratio" is defined as the ratio of the % reflectance of a liquid crystal display at the Dmin state to the % reflectance of the display at the Dmax state.

The term "active area" refers to the area of microcups filled with a liquid crystal composition optionally with guest dye(s).

The term "inactive area" refers to the partition area between the microcups filled with a liquid crystal composition optionally with guest dye(s).

Figure 1:
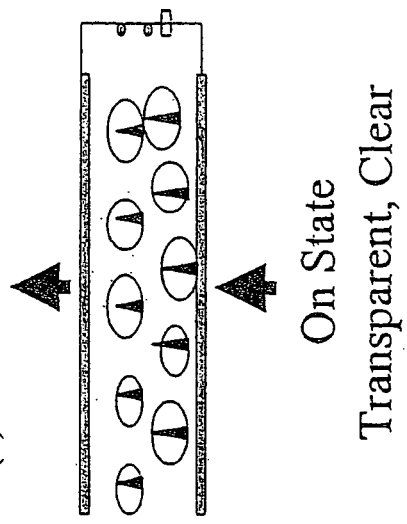
FIGS. 1a and 1b show the "off" and "on" states of a conventional polymer dispersed liquid crystal display, respectively.
FIG. 1c a typical single layer microcup liquid crystal display prepared by the microcup technology, optionally with a darkened background to improve the contrast ratio.
Figure 1:
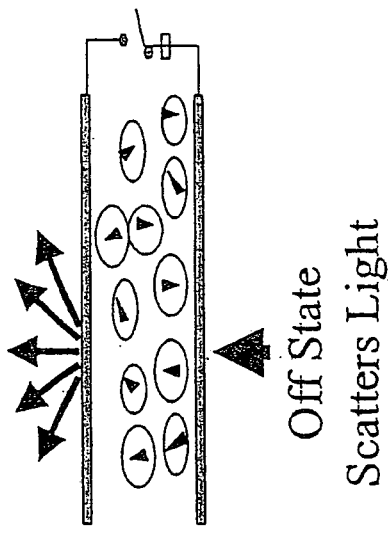
Figure 1:
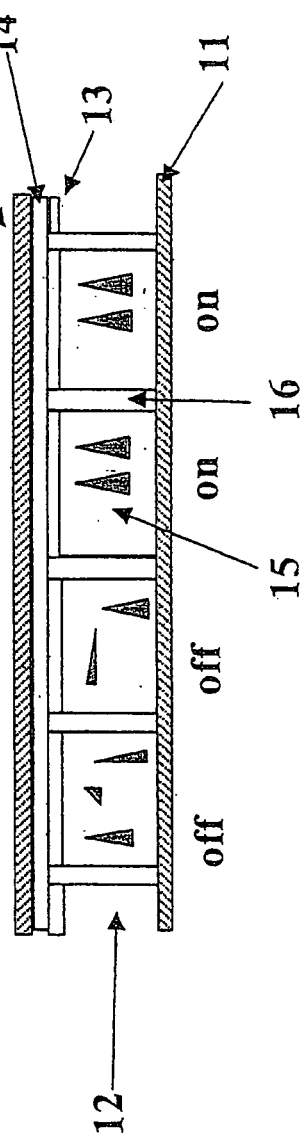

Liquid crystal display cells prepared by the microcup technology, as shown in FIG. 1c, comprise two electrode plates (10, 11), at least one of which is transparent (10), and a layer of microcups (12) enclosed between the two electrodes. The microcups are filled with a liquid crystal composition (15) optionally comprising guest dye(s) and sealed with a sealing layer (13). Not shown in FIG. 1c, the sealing layer preferably extends over the partition walls (16) and forms a contiguous layer thereon. The sealed microcups are laminated onto the second conductor film (10) optionally with an adhesive layer (14). When a voltage difference is imposed between the two electrodes, the liquid crystal display will switch between a colored or a colorless state, seen through the transparent conductor film (10). The electrode plate (11) on the non-viewing side may be colored to enhance the contrast ratio.

FIGS. 1a and 1b show the "off" and "on" states of a conventional polymer dispersed liquid crystal display, respectively. In the "off" state, the liquid crystals in the droplets are randomly aligned, and the display is opaque to the viewer. In the "on" state, the liquid crystals are aligned by the electric field, and the display is transparent to the viewer since the ordinary index of the liquid crystals is matched to the isotropic index of the polymeric continuous phase.

Figure 2:
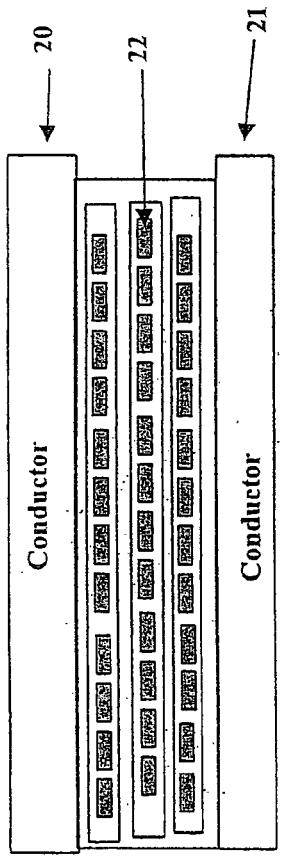
FIG. 2a shows a monochrome multilayer microcup-based liquid crystal display.
FIG. 2b shows a full-color multilayer microcup-based liquid crystal display using color filters.
FIG. 2c shows a full-color multilayer microcup-based liquid crystal display using colored liquid crystal compositions.
Figure 2:
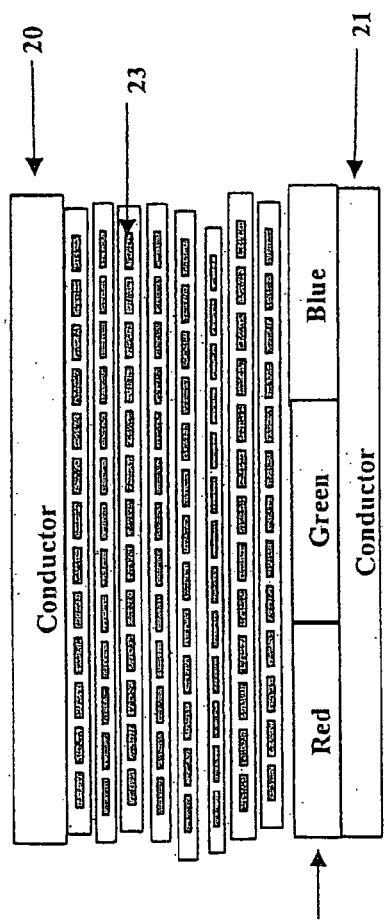
Figure 2:
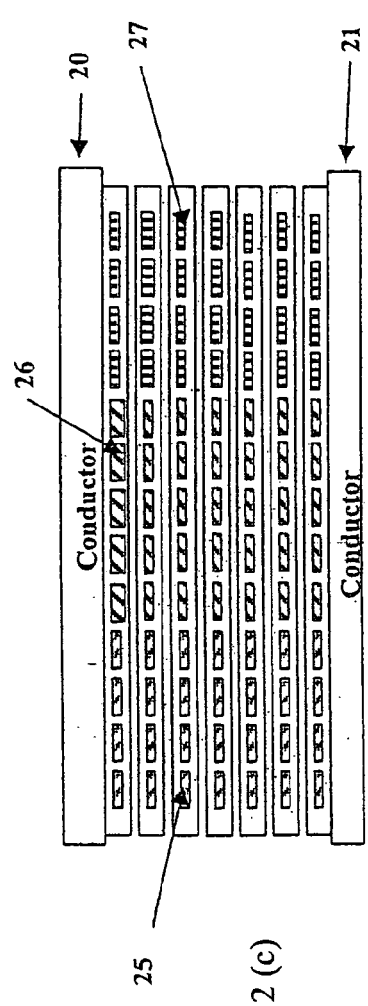

FIG. 2a shows a monochrome multilayer liquid crystal display comprising layers of microcup array filled with a liquid crystal composition (22). At least one of the two electrode plates (20, 21) is transparent. The electrode plate on the non-viewing side is optionally colored or blackened to improve the contrast ratio.

FIG. 2b shows a full-color multilayer liquid crystal display using a color filter (24) between the conductor layer (21) and the bottom layer of microcup array. A liquid crystal composition (23) which may optionally comprise a black dichroic dye is filled into the microcups.

FIG. 2c shows a full-color multilayer liquid crystal display using liquid crystal compositions (25, 26, 27) containing, for example, green, red and blue dichroic dyes, respectively.

The microcup layers are preferably arranged in a staggered fashion to reduce the light leakage through the partition walls. Although not shown in FIG. 2c, the layers of a full color multilayer liquid crystal display may also be arranged in a staggered fashion.

For the purpose of illustration, in the multiplayer liquid crystal display as shown in the figures, the top (or upper) layer is the viewing side whereas the bottom (or lower) layer is the non-viewing side.

1. Preparation of the Microcups

The microcup array may be prepared by either microembossing, photolithography or pre-punched holes as disclosed in WO02/56097 and U.S. Ser. No. 09/942,532 filed on Aug. 29, 2002 (U.S. Publication No. 2002-75556 published on Jun. 20, 2002), both of which are incorporated herein by reference in their entirety.

Suitable compositions for the preparation of the microcups are also disclosed in these references. Examples of compositions for microembossing or photolithography disclosed in WO02/56097 include thermoplastics, thermosets or precursors thereof, such as multifunctional acrylates or methacrylates, vinyl ethers, epoxides and oligomers or polymers thereof or the like. In one embodiment, multifunctional acrylates and oligomers thereof may be used. A combination of a multifunctional epoxide and a multifunctional acrylate is also useful to achieve desirable physico-mechanical properties. A crosslinkable oligomer imparting flexibility, such as urethane acrylate or polyester acrylate, is usually added to improve the flexure resistance of the embossed microcups. The composition may contain monomer, oligomer, additives and optionally a polymer. The glass transition temperatures (or Tg) for this class of materials usually range from about −70° C. to about 150° C., preferably from about −20° C. to about 50° C. The microembossing process is typically carried out at a temperature higher than the Tg. A heated male mold or a heated housing substrate against which the mold presses may be used to control the microembossing temperature and pressure.

To improve the embossing process latitude and switching performance, the microcup composition for embossing may be pre-saturated with a liquid crystal composition. In one embodiment, the liquid crystal composition is at a concentration no greater than its solubility limit in the hardened microcup walls or partition areas. Although it is not required, the same liquid crystal composition used to fill the microcups may be used to saturate the partition walls. In one embodiment, to achieve optimum switching performance, the concentration of the liquid crystals in the hardened partition walls is optimized to avoid the formation of observable light scattering domain in the partition walls.

To improve the switching rate and reduce the operation voltage or reorientation field strength, a speed enhancing comonomer or oligomer may be added in the microcup composition for microembossing or photolithography. Suitable speed enhancing comonomers or oligomers for preparation of microcups of the invention may include, but are not limited to, comonomers or oligomers comprising poly(ethylene glycol) or poly(propylene glycol) moiety, such as poly(ethylene glycol) monoacrylate, poly(ethylene glycol) monomethacrylate, poly(ethylene glycol) diacrylate, poly(ethylene glycol) dimethacrylate, poly(propylene glycol) monoacrylate, poly(propylene glycol) monomethacrylate, poly(propylene glycol) diacrylate, poly(propylene glycol) dimethacrylate or the like. The concentration of the speeding enhancing comonomer or oligomer in the microcup composition may range from about 1% to about 50% by weight, preferably from about 3% to about 30% by weight and more preferably from about 5% to about 20% by weight.

In general, the microcups can be of any shape, and their sizes and shapes may vary. The microcups may be of substantially uniform size and shape in one system. However, in order to maximize the optical effect, microcups having a mixture of different shapes and sizes may be produced. For example, microcups filled with a liquid crystal composition comprising a red guest dye may have a different shape or size from the green microcups or the blue microcups. Furthermore, a pixel may consist of different numbers of microcups of different colors. For example, a pixel may consist of a number of small green microcups, a number of large red microcups and a number of small blue microcups. It is not necessary to have the same shape and number for the different colors.

The openings of the microcups may be circular, square, rectangular, hexagonal or any other shape. The partition areas between the openings are preferably kept small in order to achieve high color saturation and contrast ratio while maintaining desirable mechanical properties. Consequently, the honeycomb-shaped opening is preferred over, for example, the circular opening.

The dimension of each individual microcup may be in the range of about 0.04 to about 100 μm2, preferably from about 1 to about 36 μm2. The depth of the microcups may be in the range of about 0.5 to about 10 microns, preferably from about 1 to about 6 microns. The ratio of the opening area to the total area of the microcup layer in a multilayer microcup liquid crystal display may vary within a wide range. In one embodiment, it usually ranges from about 0.05 to about 0.97. In another embodiment, it may range from about 0.3 to about 0.95. The ratio may also be less than 0.05.

II. Liquid Crystals, Dichroic Dyes and their Mixtures

The array of microcups is filled with liquid crystals, usually by a coating or printing process. Liquid crystals may also comprise a dichroic dye to impart color to the display and to increase the contrast.

Liquid crystal materials that may be used in the present invention are well known in the art. Examples of liquid crystal materials that may be used in the present invention may include, but are not limited to, E7, TL205, TL213, BL006, BL009 and BL037 from E. Merck Co. (Germany). Other useful liquid crystal materials may be found in U.S. Pat. No. 5,835,174 (Clikeman, et al.). Cholesteric liquid crystals may also be used in some applications.

In one embodiment, liquid crystals may comprise guest dye(s). Guest dyes may be dichroic which are well known in the art. U.S. Pat. No. 5,589,100 (Grasso, et al) states that arylazo or poly(arylazo) dichroic dyes may be used with liquid crystals and lists other suitable dichroic dyes.

The incorporation of dyes not only adds color but also substantially improves contrast in some display applications. Suitable guest dye(s) should provide good viewing characteristics, such as high contrast, high extinction and chemical and photochemical stability. In one embodiment, the dyes are those of high order parameters and proper solubility in the host liquid crystal material. High order parameter is promoted by dyes with an elongated shape having a high ratio of molecular length to width, similar to the shape of the molecules of liquid crystal host material. Examples of dichroic dyes having a high dichroic ratio may include the Blue AB2, Red AR1 and Yellow AG1 from Funktionfluid Gmb (Germany) and SI-486 (yellow), S1426 (red), M483 (blue), S344 (black), S428 (black) and S7 (black) from Mitsui Toatsu.

Nonionic azo and anthraquinone dyes are also useful. Examples may include, but are not limited to, Oil Red EGN, Sudan Red, Sudan Blue, Oil Blue, Macrolex Blue, Solvent Blue 35, Pylam Spirit Black and Fast Spirit Black from Pylam Products Co., Arizona, Sudan Black B from Aldrich, Thermoplastic Black X-70 from BASF, anthraquinone blue, anthraquinone yellow 114, anthraquinone red 111, 135 and anthraquinone green 28 from Aldrich. In any case, the dye must be chemically stable and should have a low solubility in the microcup material. Liquid crystals or dyes should not at any time attack the microcups.

III. Sealing of the Microcups

The sealing of the microcups may be accomplished in a number of ways. One approach is the "one-pass" method which involves dispersing a UV curable sealant composition into the liquid crystal composition. The UV curable composition is immiscible with, and has a specific gravity lower than that of, the liquid crystals. The UV curable composition and the liquid crystal composition are thoroughly blended in an in-line mixer and immediately coated onto the microcups with a precision coating mechanism such as Myrad bar, gravure, doctor blade, slot coating or slit coating. Volatile solvents may be used to control the viscosity and the coverage of the coating and to facilitate the phase separation of the sealant phase from the liquid crystals. Excess fluid may be scraped away by a wiper blade or a similar device. The thus-filled microcups are then dried and the UV curable composition floats to the top of the liquid crystals. The microcups may be sealed by curing the supernatant UV curable layer during or after it floats to the top. UV or other forms of radiation such as visible light, IR and electron beam may be used to harden and seal the microcups. Alternatively, heat, moisture or the combination thereof may also be employed to harden and seal the microcups, when a heat or moisture curable sealant composition is used. In the case that a polymeric sealing composition is used, the sealing layer may be hardened by simply evaporating the solvent(s) in the composition during or after it floats to the top.

Surfactants may be used to improve the adhesion of the sealing layer to the microcup wall and the wetting at the interface between the liquid crystals and the sealing material. Useful surfactants may include the FC surfactants from 3M Company, Zonyl fluorosurfactants from DuPont, fluoroacrylates, fluoromethacrylates, fluoro-substituted long chain alcohols, perfluoro-substituted long chain carboxylic acids and derivatives thereof and Silwet surfactants from OSi.

Alternatively, the liquid crystal composition and the sealing composition may be coated sequentially into the microcups (i.e., known as the "two-pass method"). Thus, the sealing of the microcups may be accomplished by overcoating a thin layer of a polymeric material or precursors thereof which may be hardened or cured by radiation, heat, moisture or interfacial reactions on the surface of the filled microcups. Interfacial polymerization followed by UV curing is very beneficial to the sealing process. Intermixing between the liquid crystal layer and the overcoat can be significantly suppressed by the formation of a thin barrier layer at the interface by interfacial polymerization. The sealing is then completed by a post curing step, preferably by UV radiation. To further reduce the degree of intermixing, it is highly desirable that the specific gravity of the overcoating is lower than that of the liquid crystals. Volatile organic solvents may be used to adjust the viscosity and the thickness of the coating. When a volatile solvent is used in the overcoat, it is preferred that it is immiscible with the liquid crystal composition or the dye and has a specific gravity lower than that of the liquid crystal phase. The two-pass overcoating process is particularly useful when the dye or liquid crystal material used is not completely immiscible with the sealing layer. To further reduce the degree of intermixing between the sealing layer and the liquid crystal phase, the filled microcup array may be chilled before overcoating of the sealant layer.

Alternatively, sealing of the filled microcups may be achieved by transfer laminating an adhesive layer from a release substrate onto the filled microcups, preferably followed by hardening the adhesive layer by heat, radiation or by simple solvent evaporation and finally peeling off the release substrate. Chilling of the filled microcups is also beneficial to the sealing by transfer lamination process.

IV. Preparation of a Single Layer Liquid Crystal Display Panel

The process can be a continuous roll-to-roll process as disclosed in WO02/56097. It may comprise the following steps:
1. Coat a layer of a composition for forming the microcups optionally with a solvent on a conductor film. The solvent, if present, readily evaporates.
2. Emboss the layer of microcup composition at a temperature higher than the glass transition temperature of the microcup composition by a pre-patterned male mold.
3. Release the mold from the microcup composition preferably during or after it is hardened by proper means.
4. Fill the microcups with a liquid crystal composition optionally comprising a guest dye followed by sealing of the filled microcups by either the one-pass or two-pass overcoating process described above.
5. Laminate the sealed microcup array with a second conductor film, optionally with an adhesive layer which may be a pressure sensitive adhesive, a hot melt adhesive, a heat, moisture or radiation curable adhesive.

The laminate adhesive may be post cured by radiation such as UV through the top conductor film if the latter is transparent to the radiation. The finished product may be cut to various size and shape after the lamination step.

In one embodiment, the microcup composition referred to above may comprise liquid crystals. In another embodiment, the microcup composition referred to above may comprise a speed enhancing comonomer or oligomer. In either embodiment, the main component of the microcup composition may be a thermoplastic, thermoset or a precursor thereof as described above.

The preparation of the microcups described above can be conveniently replaced by the alternative procedure of photolithography as disclosed in WO02/56097 or pre-punched holes as described in U.S. Publication No. 2002-75556. A full-color liquid crystal display may be prepared by sequentially filling liquid crystal compositions comprising different guest dyes into the microcups and subsequently sealing the filled microcups by the one-pass or two-pass method as described above.

V. Preparation of a Single Layer of Multi-Color Liquid Crystal Display Panel

A multi-color liquid crystal display of the present invention may be prepared by using color (e.g., R, G and B) filters and a black matrix underneath the monochrome display as shown in FIG. 2b. Alternatively, a full-color display of the present invention can be prepared by filling microcups with liquid crystals containing guest dye(s) of different colors (FIG. 2c). In addition to the processes described in the preparation of monochrome displays, additional steps may be required for such a color display. These additional steps include (1) coating or laminating the already formed microcups with a positively working photoresist such as a dry-film photoresist which may comprise a removable support such as PET-4851 (Saint-Gobain, Worcester, Mass.), a novolac positive photoresist such as Microposit™ S1818 (Shipley) and an alkali-developable adhesive layer such as a mixture of Nacor™ 72-8685 (National Starch) and Carboset™ 515 (BF Goodrich); (2) selectively opening some of the microcups by imagewise exposing the positive photoresist, removing the support film and developing the positive photoresist with a developer such as diluted Microposit™ 351 developer (Shipley); (3) filling the opened microcups with liquid crystals and guest dye(s) of the first primary color and (4) sealing the filled microcups as described in the preparation of monochrome displays. These additional steps may be repeated to create microcups filled with liquid crystals of the second and third primary colors.

More specifically, a multi-color liquid crystal display may be prepared according to the steps below:

(a) Coat a layer of a composition for forming the microcups on a conductor film.
(b) Emboss the layer of microcup composition at a temperature higher than its Tg by a pre-patterned male mold.
(c) Release the mold from the layer of microcup composition preferably during or after it is hardened by solvent evaporation, cooling or crosslinking by radiation, heat or moisture.
(d) Laminate or coat the thus formed array of microcups with a positive dry-film photoresist which may comprise a positive photoresist and a removable plastic cover sheet. The positive dry-film photoresist may also comprise an adhesive layer to improve the adhesion between the microcups and the positive photoresist.
(e) Imagewise expose the positive photoresist, remove the cover sheet, develop and open microcups in the exposed area. The purpose of steps (d) and (e) is to selectively open the microcups in a predetermined area.
(f) Fill the opened microcups with a liquid crystal composition containing guest dye(s) of a first primary color and a sealing composition, which is incompatible with the liquid crystal phase and has a lower specific gravity than the liquid crystal phase.
(g) Seal the microcups to form closed liquid crystal filled microcups containing liquid crystals with guest dye(s) of the first primary color by the one-pass or two-pass method as described above.
(h) Repeat steps (e)~(g) described above to generate microcups containing liquid crystals with guest dye(s) of different colors in different areas.
(i) Laminate the sealed array of liquid crystal filled microcups to a second conductor film pre-coated with an adhesive layer which may be a pressure sensitive adhesive, a hot melt adhesive, or a heat, moisture or radiation curable adhesive.
(j) Harden the adhesive.

In one embodiment, the microcup composition referred to above may comprise liquid crystals. In another embodiment, the microcup composition referred to above may comprise a speed enhancing comonomer or oligomer. In either embodiment, the main component of the microcup composition may be a thermoplastic, thermoset or a precursor thereof.

The preparation of the microcups described above can be conveniently replaced by the alternative procedure of photolithography as disclosed in WO02/56097 or pre-punched holes as described in U.S. Publication No. 2002-75556. The dry-film positive photoresist in step (e) may be replaced by a photoresist solution and coated onto the microcups. Still alternatively, the liquid crystal phase of different color may be printed by, for example, inkjet printing with registration onto microcups in preselected areas.

VI. Liquid Crystal Display Having Multiple Layers of Display Panel and its Manufacture FIGS. 3a and 3b show the methods for the manufacture of a microcup-based liquid crystal display having two or more layers of filled and sealed microcup array.

Figure 3A:
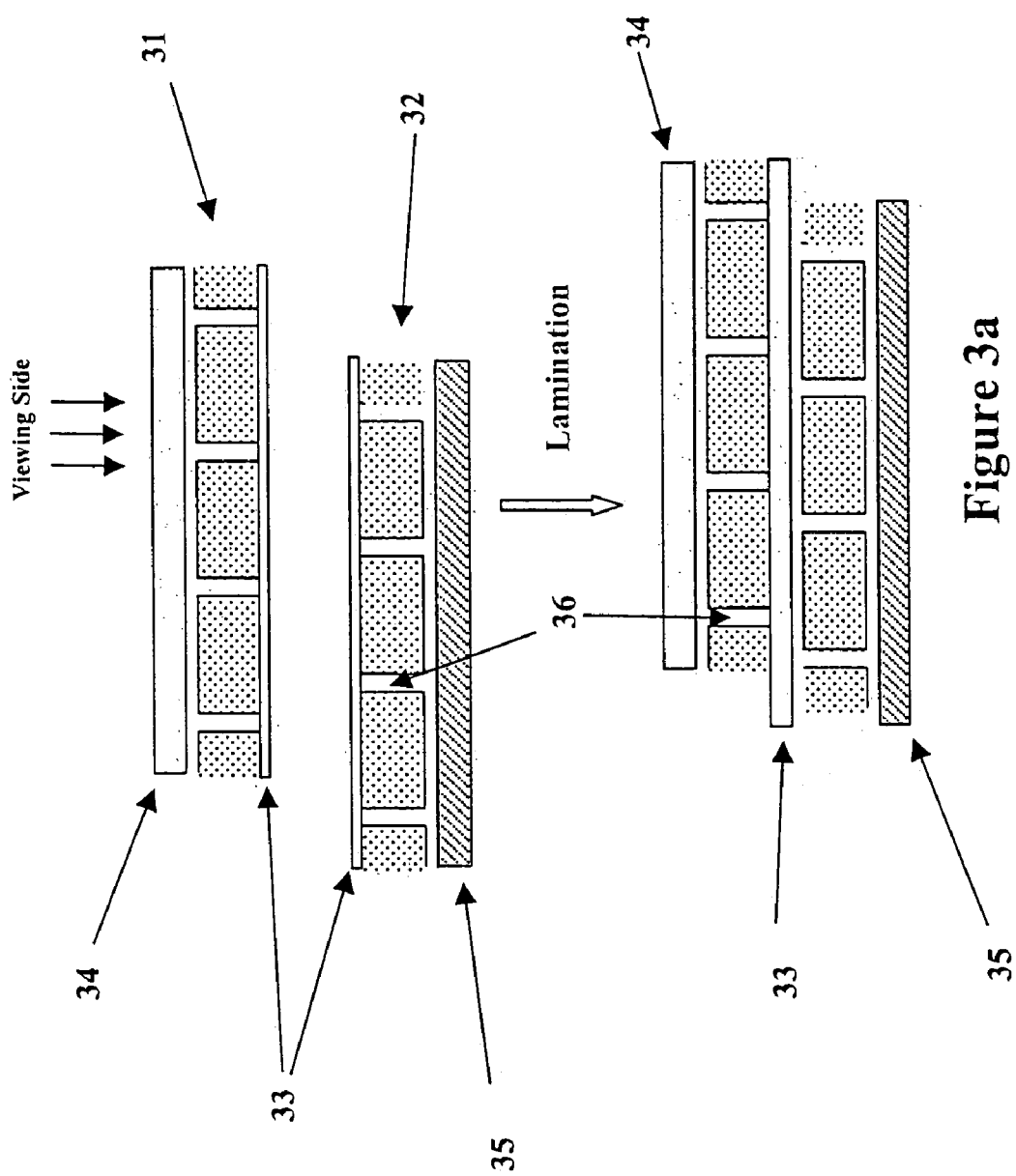
FIGS. 3a and 3b show the methods for the manufacture of a multilayer microcup-based liquid crystal display.

FIG. 3a shows the process of preparing a two layer microcup-based liquid crystal display by laminating a top layer (31) and a bottom layer (32) of filled and sealed microcup array prepared by, for example, the procedure described in the steps 1–4 in Section IV or steps (a)–(h) in Section V. The filled microcups are individually sealed with a sealing layer (33). The conductor film (34) on the viewing side is transparent and the conductor film (35) on the non-viewing side may be colored or blackened. An adhesive layer may be used to facilitate the lamination process. The two layers (31 and 32) are arranged with the inactive partition areas (36) of one layer and the active cell areas of another layer in a staggered fashion.

Figure 3B:
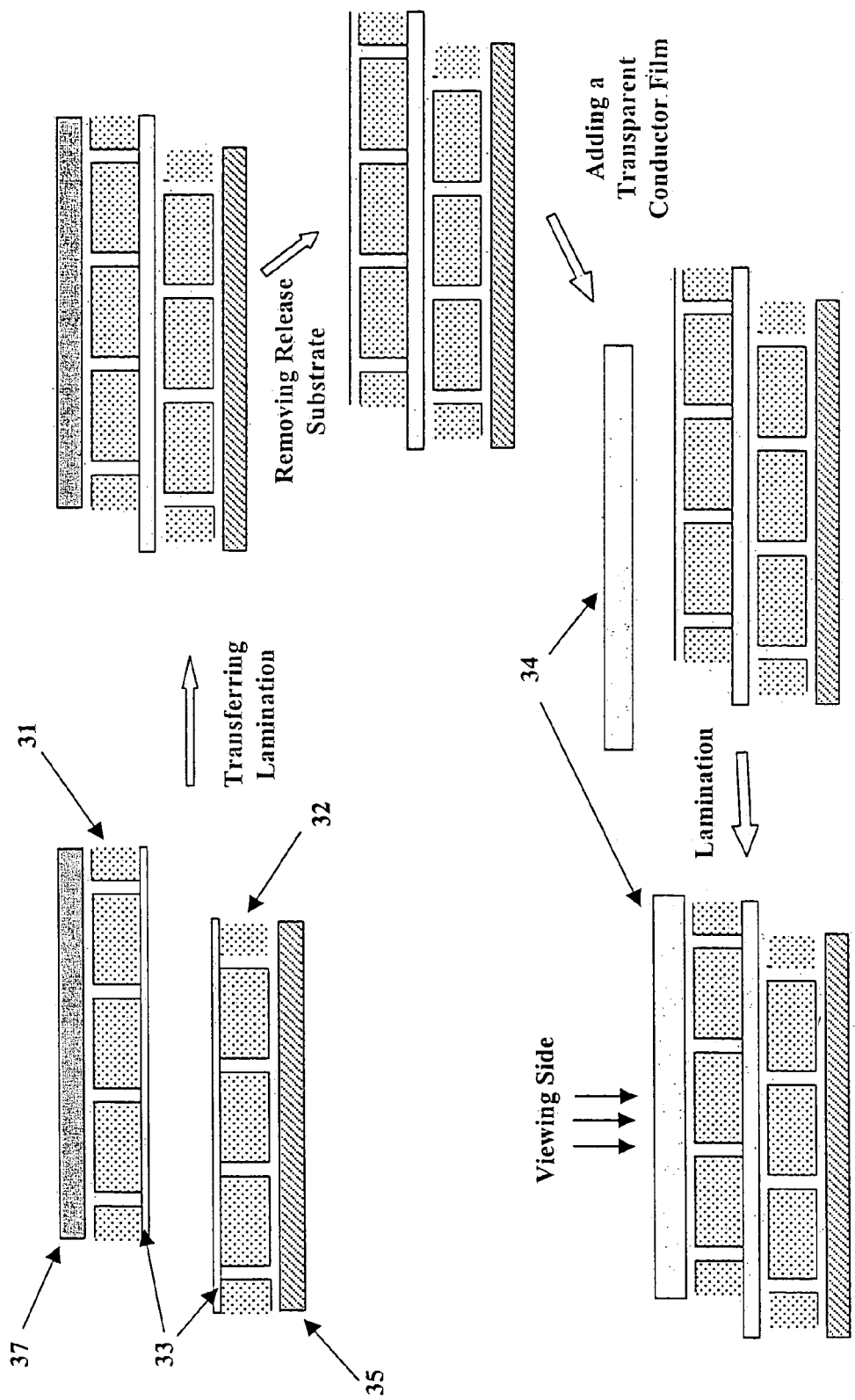

FIG. 3b shows an alternative process of preparing a two-layer microcup liquid crystal display by (i) preparing a layer of filled and sealed microcup array (32) on a conductor film (35) by, for example, the procedure described in the steps 1–4 in Section IV or steps (a)–(h) in Section V; (ii) preparing another layer of filled and sealed microcup array (31) on a release substrate (37) following the procedure described in the steps 1–4 in Section IV or steps (a)–(h) in Section V; (iii) laminating the layer of microcup array (31) on the release substrate (37) onto the layer (32), optionally with an adhesive (not shown) with the sealing sides (33) facing each other; (iv) removing the release substrate (37) and (v) laminating onto the resultant composite film a conductor film (34), optionally with an adhesive layer (not shown). The steps (ii), (iii), and (iv) may be repeated to prepare a liquid crystal display having more than two layers of microcup array.

Alternatively, a multilayer layer microcup-based liquid crystal display may be prepared by (a) preparing a layer of filled and sealed microcup array on a conductor film by, for example, the procedure described in the steps 1–4 in Section IV or steps (a)–(h) in Section V; (b) repeating the steps 1–4 in section IV or steps (a)–(h) in Section V to build any number of layers of filled and sealed microcup array on top of the first layer and (c) laminating the top-most layer with a second conductor film, optionally with an adhesive layer which may be a pressure sensitive adhesive, a hot melt adhesive, a heat, moisture or radiation curable adhesive.

For the two-layer or multilayer liquid crystal display as prepared above, in one embodiment, the inactive partition areas of a layer of midrocup array are arranged with the active areas of another layer above or underneath in a staggered manner. At least one of the two conductor films (34 and 35) is pre-patterned. Also at least the conductor film (34) on the viewing side is transparent. To avoid the formation of undesirable Moire pattern, it is useful to laminate the microcup layers at an appropriate angle. Alternatively, a less symmetrical microcup array may be used for similar purpose.

In the multilayer liquid crystal display, each of the layers of the microcups may be independently prepared by microembossing, photolithography or pre-punched holes. The liquid crystal composition may be filled into the microcups by printing or coating, such as inkjet printing.

In general, the cell gap or the shortest distance between the two electrodes in a microcup-based liquid crystal display may be in the range of 2 to 100 μm, preferably in the range of 5 to 30 μm. The thickness of each microcup layer may vary. In one embodiment, the thickness may be in the range of 2 to 50 μm, preferably in the range of 3 to 10 μm. The concentration of dyes or colorants in each layer of microcup array may also vary for different applications.

The thickness of the multilayer display produced by the present processes may be as thin as a piece of paper. The width of the display is the width of the coating web (typically 3–90 inches). The length of the display may be anywhere from inches to thousands of feet depending upon the size of the roll.

EXAMPLES

The following examples are given to enable those skilled in the art to more clearly understand and to practice the present invention. They should not be considered as limiting the scope of the invention, but merely as being illustrative and representative thereof.

Example 1

Preparation of Microcups by Microembossing

The composition shown in Table 1 was coated by a Myrad bar #6 onto a 2 mil PET film precoated with an ITO conductor layer (ITO/PET film, 5 mil OC50 from CPFilms, Martinsville, Va.). A pre-patterned (4 μm width×4 μm length×4 μm height×4 μm partition) cobalt nickel male mold and a mold release Frekote 700-NC from Henkel were used for microembossing. The coating thickness was controlled to be about 5 microns. The coated film was then embossed by the mold using a pressure roller at 90° C. The coating was then UV-cured for about 1 minute through the Mylar film using a Cure Zone exposure unit (ADAC Technologies) equipped with a metal fluoride lamp with an intensity of 80 mW/cm$^2$ at 365 nm. The embossed film was then released from the mold to reveal the microcups (4 μm width×4 μm length×4 μm depth×4 μm partition). The microembossing was carried out using the GBC Laminator at 90° C.

TABLE 1

UV-curable Acrylate Formulation for Microcups

| No. | Description | Ingredient | Supplier | Parts |
|---|---|---|---|---|
| 1 | Epoxy acrylate | Ebecryl 600 | UCB Chemicals | 55 |
| 2 | Polyester acrylate | Ebecryl 830 | UCB Chemicals | 15 |
| 3 | Urethane acrylate | Ebecryl 6700 | UCB Chemicals | 10 |
| 4 | Silicon Acrylate | Ebecryl 350 | UCB Chemicals | 5 |
| 5 | Monomer | Sartomer SR238 | Sartomer | 10 |
| 6 | Monomer | Sartomer SR306 | Sartomer | 5 |
| 7 | Monomer | Sartomer SR351 | Sartomer | 5 |
| 8 | Photoinitiator | Irgacure 500 | Ciba | 1 |
| 9 | Synergist | Methyl diethanol amine | Aldrich | 0.5 |
| 10 | Solvent | MEK | Aldrich | 100 |

Example 2

Preparation of Microcups by Microembossing

The same procedure of Example 1 was followed and the formulation shown in Table 2 was coated and embossed with the same 4×4×4×4 μm male mold.

TABLE 2

UV-curable Acrylate Formulation for Microcups

| No. | Description | Ingredient | Supplier | Parts |
|---|---|---|---|---|
| 1 | Epoxy acrylate | Ebecryl 600 | UCB Chemicals | 50 |
| 2 | Polyester acrylate | Ebecryl 830 | UCB Chemicals | 15 |
| 3 | Urethane acrylate | Ebecryl 6700 | UCB Chemicals | 10 |
| 4 | Silicon acrylate | Ebecryl 350 | UCB Chemicals | 5 |
| 5 | Monomer | Poly(ethylene glycol) methacrylate | Aldrich | 5 |
| 6 | Monomer | Sartomer SR238 | Sartomer | 5 |
| 7 | Monomer | Sartomer SR306 | Sartomer | 5 |
| 8 | Monomer | Sartomer SR351 | Sartomer | 5 |
| 9 | Photoinitiator | Irgacure 907 | Ciba | 0.5 |
| 10 | Solvent | MEK | Aldrich | 300 |

A Myrad bar #12 was used. The target coating thickness was about 5 μm. The microembossing was carried out using a pressure roller (GBC Laminator) heated at 90° C.

Example 3

Preparation of Microcups by Microembossing

The composition shown in Table 3 was laminated using a pressure roller between a 2 ml PET film precoated with an ITO conductor layer and a pre-patterned (4×4×4 microns) cobalt nickel mold. The PET/ITO film was treated with a corona a discharge (Electro-Technic Products, Model BD-10A, Chicago, Ill.) for 5 seconds. The cobalt nickel mold was pretreated with a mold release Frekote 750-NC. The coating was then UV cured for 1 minute through the PET/ITO film. The embossed film was then released from the mold to reveal the microcups (4×4×4 microns) with a thickness of 5.5 microns as measured by a Mituyoto thickness gauge.

TABLE 3

UV-curable Acrylate Formulation for Microcups

| No. | Description | Ingredient | Supplier | Parts |
|---|---|---|---|---|
| 1 | Epoxy acrylate | Ebecryl 600 | UCB Chemicals | 40 |
| 2 | Polyester acrylate | Ebecryl 830 | UCB Chemicals | 15 |
| 3 | Urethane acrylate | Ebecryl 6700 | UCB Chemicals | 10 |
| 4 | Silicon acrylate | Ebecryl 350 | UCB Chemicals | 5 |
| 5 | Monomer | Poly(ethylene glycol) methacrylate, (PEGMA) | Aldrich | 15 |
| 6 | Monomer | Sartomer SR238 | Sartomer | 5 |
| 7 | Monomer | Sartomer SR306 | Sartomer | 5 |
| 8 | Monomer | Sartomer SR351 | Sartomer | 5 |
| 9 | Photoinitiator | Irgacure 907 | Ciba | 0.5 |

Example 4

Preparation of Filled Microcups with Liquid Crystal Solution

The microcup array prepared in Example 3 was washed with hexane then with MEK and oven dried (66° C.) for 10 minutes. A liquid crystal BL006 (E. Merck Co., Germany) solution containing 1 wt % Silwet L7608 (OSi Specialties) was mixed with 9 times volume of MPK and the resulting solution was coated on the microcup array using a Myrad bar #16. Excess solvent in the microcups was evaporated in an oven (66° C.) for 10 minutes.

Example 5

Preparation of Filled Microcups with Liquid Crystal Solution Containing Blue Dichroic Dye The microcup array prepared in Example 3 was washed with hexane, then with MEK, and oven dried (66° C.) for 10 minutes. A liquid crystal BL006 (E. Merck Co., Germany) solution containing 3 wt % dichroic dye Blue AB2 (Funktionfluid Gmb, Germany) and 1 wt % Silwet L7608 (OSi Specialties) was mixed with 9 times volume of MPK, and the resulting solution was coated onto the microcup array using a Myrad bar #16. Excess solvent on the microcup was evaporated in an oven (66° C.) for 10 minutes.

Example 6

Preparation of Filled Microcups with Liquid Crystal Solution Containing Black Dichroic Dye Mixture The microcup array prepared in Example 3 was washed with hexane, then with MEK, and oven dried (66° C.) for 10 minutes. A black dichroic dye mixture was prepared by mixing three dichroic dyes, Blue AB2, Red AR1 and Yellow AG1 (Funktionfluid Gmb, Germany) together. A liquid crystal BL006 (E. Merck Co., Germany) solution containing 2 wt % the black dichroic dye mixture and 1 wt % Silwet L7608 (OSi Specialties) was mixed with 9 times volume of MPK and the resulting solution was coated on the microcup array using a Myrad bar #16. Excess solvent on the microcup was evaporated in an oven (66° C.) for 10 minutes.

Example 7

Sealing the Microcups by a Two-Step (Overcoating) Process

A 10% solution of Vistalon 0106 (Exxon Mobil Chemicals) in Isopar E (Exxon Chemical) was coated onto a BL006-filled microcup array prepared in Example 4, 5 or 6. The coating layer was uniform and transparent. By using a #3 Myrad bar, a sealing polymer layer with the weight coverage of 0.39 mg/in$^2$ was obtained and the thickness of the sealing polymer layer was estimated to be 0.7 μm. By using a #8 Myrad bar, a sealing polymer layer with the weight coverage of 0.75 mg/in$^2$ was obtained and the thickness of the sealing polymer layer was estimated to be 1.3 μm. The density of Vistalon 0106 was about 0.9 g/cm$^3$.

Example 8

Sealing the Microcups by a Two-Step (Overcoating) Process

Following the same procedure of Example 7, the filled microcup array was sealed by coating a 10% solution of a carboxylated acrylic copolymer, Amphomer 28-4910 (National Starch) in 2-propanol onto the BL006-filled microcups as prepared in Example 5. The coating layer was uniform and transparent. By using a #3 Myrad bar, a sealing polymer layer with the weight coverage of 0.44 mg/in$^2$ was obtained and the thickness of the sealing polymer layer was estimated to be 0.6 μm. By using a #8 Myrad bar, a sealing polymer layer with the weight coverage of 1.0 mg/in$^2$ was obtained and the thickness of the sealing polymer layer was estimated to be 1.3 μm. The density of Amphomer 28-4910 was about 1.2 g/cm$^3$.

Example 9

Traditional Polymerization Induced Phase Separation PDLC Display

For comparison, traditional polymerization induced phase separation polymer disperse liquid crystal displays were prepared. Various ratios of liquid crystal E7 (E. Merck, Germany) to Norland 65 (Norland) were mixed and sandwiched between two ITO coated glasses using spacers of various heights (4.5 μm, 25 μm or 50 μm) to control the cell gap. Step wedge was used to optimize the UV-curing time under Cure Zone exposure unit (ADAC Technologies). In all cases, a significant hysteresis loop was observed in the characteristic electro-optical response curve.

Example 10

Hysteresis-Free Liquid Crystal Display

Single layer microcup liquid crystal displays were assembled using the microcup arrays prepared in Example 1, 2 or 3. Liquid crystals with or without dichroic dye(s) were filled into microcups following the procedure described in Example 4, 5 or 6. These liquid crystal filled microcups were then sealed by the procedure described in Example 7 or 8. In all cases, no hysteresis loop was observed for the microcup-based liquid crystal displays prepared according to the present invention.

Example 11

Assembling of a Multilayer Display and Performance Thereof

A multilayer liquid crystal display was assembled to improve display performance. A single layer liquid crystal display was prepared as described in Example 10. The same procedure was followed (i) to emboss a second layer of microcup array on top of the first layer of microcup array, (ii) to fill liquid crystals with or without a guest dye and (iii) to seal the second layer of filled microcup array. The second microcup layer was embossed on the first layer at an off angle of about 10 degree to form a staggering two-layer structure to maximize the degree of light scattering. Lamination of the two double-layer arrays formed a four-layer liquid crystal display. A high contrast display was obtained with rising and falling response time of ~1 msec and ~10 msec (at 40 volts), respectively. No hysteresis loop was observed in the resultant 4-layer microcup liquid crystal display.

Examples 12–17

The same procedure of Example 8 was followed, except that the microcup composition was replaced by those listed in Table 4. The $t_{on}$ and $t_{off}$ were measured at 40 V. As it can be seen in Table 4, the addition of PEGMA (polyethyleneglycol methacrylate) or PEGDMA (polyethyleneglycol dimethacrylate) as a comonomer in the microcup composition showed a significant improvement in the response rate. The saturation voltages (voltage needed to reach the maximum optical response) in Examples 16 and 17 were 10 V and 12 V, respectively, with a threshold voltage of about 3V.

TABLE 4

Microcup composition of Examples 12–17

| Ingredient (parts) | Example 12 | Example 13 | Example 14 | Example 15 | Example 16 | Example 17 |
|---|---|---|---|---|---|---|
| Ebecryl 600 | 55 | 50 | 48 | 42 | 40 | 40 |
| Ebecryl 830 | 15 | 15 | 15 | 15 | 15 | 15 |
| Ebecryl 6700 | 10 | 10 | 10 | 10 | 10 | 10 |
| Ebecryl 350 | 5 | 5 | 5 | 5 | 5 | 5 |
| Sartomer SR238 | 5 | 5 | 5 | 5 | 5 | 5 |
| Sartomer SR306 | 5 | 5 | 5 | 5 | 5 | 5 |
| Sartomer SR351 | 5 | 5 | 5 | 5 | 5 | 5 |
| PEGMA | 0 | 5 | 7 | 13 | 15 | 0 |
| PEGDMA | 0 | 0 | 0 | 0 | 0 | 15 |
| Irgacure 500 | 1 | 1 | 0.4 | 0.4 | 0.4 | 0 |
| Irgacure 907 | 0 | 0 | 0 | 0 | 0 | 0.5 |
| triethanol amine | 0 | 0 | 0.2 | 0.2 | 0.2 | 0 |
| methyldiethanol amine | 0.5 | 0.5 | 0 | 0 | 0 | 0 |
| $t_{on}$ (msec) | 4.0 | 2.0 | 0.5 | 0.9 | 0.5 | 0.5 |
| $t_{off}$ (msec) | 23.2 | 12.5 | 11.0 | 9.5 | 23.0 | 16.0 |

While particular forms of the invention have been illustrated and described, it will be apparent that various modifications can be made without departing from the spirit and scope of the invention.

What is claimed is:

1. A liquid crystal display comprising microcups as display cells which are:
    a) formed from a microcup composition comprising a thermoplastic, a thermoset or a precursor thereof and a first liquid crystal composition;
    b) filled with a second liquid crystal composition; and
    c) sealed with a sealing layer formed from a sealing composition having a specific gravity lower than that of the second liquid crystal composition.

2. The liquid crystal display of claim 1 wherein said micro cup composition is an embossable composition.

3. The liquid crystal display of claim 1 wherein the liquid crystal in the first liquid crystal composition has a concentration no greater than its solubility limit in the microcup composition.

4. The liquid crystal display of claim 1 wherein said thermoplastic, thermo set or precursor thereof is a multifunctional acrylate or methacrylate, vinyl ether, epoxide or an oligomer or polymer thereof.

5. A liquid crystal display comprising microcups as display cells which are:
    a) formed from a microcup composition comprising a thermoplastic, a thermoset or a precursor thereof and a speed enhancing comonomer or oligomer;
    b) filled with a liquid crystal composition; and
    c) sealed with a sealing layer formed from a sealing composition having a specific gravity lower than that of the liquid crystal composition.

6. The liquid crystal display of claim 5 wherein said microcup composition is an embossable composition.

7. The liquid crystal display of claim 5 wherein said speed enhancing comonomer or oligomer comprises a poly(ethylene glycol) or poly(propylene glycol) moiety.

8. The liquid crystal display of claim 7 wherein said poly(ethylene glycol) or poly(propylene glycol) moiety is poly(ethylene glycol) monoacrylate, poly(ethylene glycol) monomethacrylate, poly(ethylene glycol) diacrylate, poly(ethylene glycol) dimethacrylate, poly(propylene glycol) monoacrylate, poly(propylene glycol) monomethacrylate, poly(propylene glycol) diacrylate or poly(propylene glycol) dimethacrylate.

9. The liquid crystal display of claim 5 wherein said thermoplastic, thermoset or precursor thereof is a multifunctional acrylate or methacrylate, vinyl ether, epoxide or an oligomer or polymer thereof.

10. A liquid crystal display comprising two or more layers of microcups wherein said microcups are:
    a) formed from a microcup composition comprising a thermoplastic, a thermoset or a precursor thereof and a first liquid crystal composition;
    b) filled with a second liquid crystal composition; and
    c) sealed with a sealing layer formed from a sealing composition having a specific gravity lower than that of the second liquid crystal composition.

11. The liquid crystal display of claim 10 wherein the liquid crystal has a concentration no greater than its solubility limit in the microcup composition.

12. The liquid crystal display of claim 10 wherein said thermoplastic, thermoset or precursor thereof is a multifunctional acrylate or methacrylate, vinyl ether, epoxide or an oligomer or polymer thereof.

13. The liquid crystal display of claim 10 wherein said two or more layers of microcups are sandwiched between two conductor films.

14. A liquid crystal display comprising two or more layers of microcups, wherein said microcups are formed from a microcup composition comprising a thermoplastic, a thermoset or a precursor thereof and a first liquid crystal composition; wherein said two or more layers of microcups are arranged in a staggered manner, wherein said microcups are filled with a second liquid crystal composition and sealed with a sealing layer formed from a sealing composition having a specific gravity lower than that of the second liquid crystal composition.

15. A liquid crystal display comprising two or more layers of microcups wherein said microcups are:
    a) formed from a microcup composition comprising a thermoplastic, a thermoset or a precursor thereof and a speed enhancing comonomer or oligomer;
    b) filled with a liquid crystal composition; and
    c) sealed with a sealing layer formed from a sealing composition having a specific gravity lower than that of the liquid crystal composition.

16. The liquid crystal display of claim 15 wherein said speed enhancing comonomer or oligomer comprises a poly (ethylene glycol) or poly(propylene glycol) moiety.

17. The liquid crystal display of claim 16 wherein said poly(ethylene glycol) or poly(propylene glycol) moiety is poly(ethylene glycol) monoacrylate, poly(ethylene glycol) monomethacrylate, poly(ethylene glycol) diacrylate, poly (ethylene glycol) dimethacrylate, poly(propylene glycol) monoacrylate, poly(propylene glycol) monomethacrylate, poly(propylene glycol) diacrylate or poly(propylene glycol) dimethacrylate.

18. The liquid crystal display of claim 15 wherein said thermoplastic, thermoset or precursor thereof is a multifunctional acrylate or methacrylate, vinyl ether, epoxide or an oligomer or polymer thereof.

19. The liquid crystal display of claim 15 wherein said two or more layers of microcups are sandwiched between two conductor films.

20. A liquid crystal display comprising two or more layers of microcups, wherein said microcups are formed from a microcup composition comprising a thermoplastic, a thermoset or a precursor thereof and a speed enhancing comonomer or oligomer; wherein said two or more layers of microcups are arranged in a staggered manner; wherein said microcups are filled with a liquid crystal composition and sealed with a sealing layer formed from a sealing composition having a specific gravity lower than that of the liquid crystal composition.

* * * * *